US009435366B2

(12) United States Patent
Draht et al.

(10) Patent No.: US 9,435,366 B2
(45) Date of Patent: Sep. 6, 2016

(54) METHOD FOR ESTABLISHING A NAIL CONNECTION AND NAILS THEREFOR

(75) Inventors: Torsten Draht, Bielefeld (DE); Gerson Meschut, Bielefeld (DE)

(73) Assignee: Böllhoff Verbindungstechnik GmbH (DE)

( * ) Notice: Subject to any disclaimer, the term of this patent is extended or adjusted under 35 U.S.C. 154(b) by 0 days.

(21) Appl. No.: 13/618,229

(22) Filed: Sep. 14, 2012

(65) Prior Publication Data

US 2013/0008009 A1    Jan. 10, 2013

Related U.S. Application Data

(62) Division of application No. 11/994,295, filed on Dec. 28, 2007, now Pat. No. 8,375,549.

(30) Foreign Application Priority Data

Jan. 17, 2006 (DE) ........................ 10 2006 002 238

(51) Int. Cl.
*F16B 19/14* (2006.01)
*F16B 15/06* (2006.01)

(52) U.S. Cl.
CPC ................ *F16B 19/14* (2013.01); *F16B 15/06* (2013.01); *Y10T 29/49833* (2015.01); *Y10T 29/49835* (2015.01); *Y10T 29/49837* (2015.01); *Y10T 29/49947* (2015.01); *Y10T 29/5343* (2015.01); *Y10T 29/53522* (2015.01)

(58) Field of Classification Search
CPC ........ F16B 15/00; F16B 15/02; F16B 15/06; F16B 19/14; F16B 15/04

USPC ............ 411/399, 439, 451.1, 455, 493, 498, 411/499, 922, 923
See application file for complete search history.

(56) References Cited

U.S. PATENT DOCUMENTS

| | | | | |
|---|---|---|---|---|
| 199,957 | A * | 2/1878 | Boyer | 52/521 |
| 1,072,107 | A * | 9/1913 | Filshe | 411/484 |
| 1,506,576 | A * | 8/1924 | Garrigus | 40/668 |
| 1,699,421 | A * | 1/1929 | Bean | 411/481 |
| 2,058,273 | A * | 10/1936 | Upton | 411/377 |
| 2,099,990 | A * | 11/1937 | Rosenberg | 411/377 |

(Continued)

FOREIGN PATENT DOCUMENTS

| | | |
|---|---|---|
| DE | 1 707 412 | 9/1955 |
| DE | 1 019 869 | 11/1957 |

(Continued)

OTHER PUBLICATIONS

Hilti; Produkte/Service May 2004; 5 pages.

(Continued)

*Primary Examiner* — Flemming Saether
(74) *Attorney, Agent, or Firm* — Barclay Damon, LLP

(57) ABSTRACT

A method is described for establishing a nail connection between two components as well as a nail therefor. The nail is driven through the non-prepunched components in the joining area at a high speed such that the nail tip fully penetrates both components and forms a toric-shaped material bulge in the nail-head-side component, which protrudes into a circular groove of the nail head, and a crater-shaped material bulge is formed in the component facing away from the nail head, which protrudes in the opposite direction.

18 Claims, 5 Drawing Sheets

(56) References Cited

U.S. PATENT DOCUMENTS

| | | | | |
|---|---|---|---|---|
| 2,172,553 | A | * | 9/1939 | Tripp .......................... 411/455 |
| 2,207,897 | A | | 7/1940 | Schaus |
| 2,226,006 | A | * | 12/1940 | Maze .......................... 411/453 |
| 2,650,032 | A | * | 8/1953 | Godfrey ....................... 411/455 |
| 2,751,808 | A | * | 6/1956 | MacDonald et al. ......... 411/493 |
| 2,768,552 | A | * | 10/1956 | MacDonald .................. 411/493 |
| 3,505,919 | A | | 4/1970 | Batliner et al. |
| 3,630,253 | A | * | 12/1971 | Sherman ....................... 411/176 |
| 3,835,991 | A | | 9/1974 | Brecht |
| 4,002,098 | A | | 1/1977 | Colechia |
| 5,261,770 | A | * | 11/1993 | Hoepker et al. .............. 411/441 |
| 5,443,345 | A | * | 8/1995 | Gupta ........................... 411/441 |
| 5,489,179 | A | * | 2/1996 | Gabriel et al. ............... 411/453 |
| 5,642,974 | A | * | 7/1997 | Gabriel et al. ............... 411/453 |
| 5,658,109 | A | * | 8/1997 | Van Allman et al. ........ 411/440 |
| 5,741,104 | A | * | 4/1998 | Lat et al. ...................... 411/453 |
| 5,749,692 | A | * | 5/1998 | Kish et al. .................... 411/453 |
| 5,860,866 | A | * | 1/1999 | Van Allman et al. .......... 470/34 |
| 6,171,042 | B1 | * | 1/2001 | Olvera et al. ................. 411/441 |
| 6,805,525 | B2 | * | 10/2004 | Oswald ........................ 411/499 |
| 6,851,906 | B2 | * | 2/2005 | Gassmann et al. ........... 411/440 |
| 6,872,042 | B2 | * | 3/2005 | Panasik et al. ............... 411/481 |
| 7,040,851 | B2 | * | 5/2006 | Esser et al. ................. 411/451.1 |
| 7,207,761 | B2 | * | 4/2007 | Dill et al. ..................... 411/450 |
| 7,232,283 | B2 | * | 6/2007 | Dill et al. ..................... 411/453 |

FOREIGN PATENT DOCUMENTS

| | | |
|---|---|---|
| DE | 1 773 599 | 9/1958 |
| DE | 1 940 447 | 2/1971 |
| DE | 7 226 710 | 8/1973 |
| DE | 2 250 912 | 5/1974 |
| DE | 1 575 152 | 7/1974 |
| DE | 15 00 770 B2 | 7/1976 |
| DE | 39 09 725 C1 | 9/1990 |
| DE | 39 22 684 A1 | 1/1991 |
| DE | 198 26 157 A1 | 12/1999 |
| DE | 196 37 969 C2 | 4/2000 |
| DE | 102 48 427 A1 | 8/2004 |
| DE | 10 2004 040 701 B3 | 7/2005 |
| DE | 20 2006 000 666 U1 | 4/2006 |
| EP | 0 338 973 A2 | 10/1989 |
| EP | 0 576 034 A1 | 12/1993 |
| EP | 1 253 332 A2 | 10/2002 |
| GB | 1 275 202 | 5/1972 |
| GB | 1 479 600 | 7/1977 |
| JP | 47-29168 U | 12/1972 |
| JP | 48-2920 U | 1/1973 |
| JP | 54-82859 U | 6/1979 |
| JP | 61-104814 U | 7/1986 |
| JP | 6-213220 A | 8/1994 |
| JP | 7-8614 U | 2/1995 |
| JP | 10-339312 A | 12/1998 |
| JP | 2001-3910 A | 1/2001 |
| JP | 2001-124030 A | 5/2001 |
| JP | 2003-322122 A | 11/2003 |

OTHER PUBLICATIONS

Bescheid; "Deutsches Instit Für Bautechnik"; vom. 25; Jul. 1990; 5 pages.
Tabelle 1; "Besondere Anwendungsfälle"; vom. 25; Jul. 1990; 5 pages.
Hilti DX 76 Operating Instructions Manual and Table of Contents; 35 pages.
Reuter et al.; "Direktmontageteschnik Anwendungsfelder und Montagesicherheit"; 8 pages.
Bindschedler; "Korrosionssichere Profilblechbefestigungen durch den Einsatz von Direktmontageelementen"; © Springer-Verlag 1988; 4 pages.
Hilti; "DX Problemlöser—Stahl"; © 1999; 1 page.
Hilti; "Handbuch der Befestigungstechnik—DX Produkte Information C3"; 21 pages.
Deutsches Instit Für Bautechnik; "Allegemeine bauaufsichtliche Zulassung"; Nr. Z-14.4-456; vom 21; Nov. 2005; 10 pages.
Spitfire P525L; Operator's Manual and Maintenance Instructions; 12 pages.
Bolzensetzen vol Stahl- und Aluminiumwerkstoffen; Research Report AIF-Nr. 11.659N, DVS-Nr. 5.014, SLV Nr. 5109.2000; Nov. 2001; 110 pages.
Entwicklung des Bolzensetzens für Blech-Profil-Verbindungen in Fahrzeugbau; Hahn et al.; 2005; 5 pages.
VHT Forscungsvorhaben Nr. S 619; Untersuchung der Befestlgungstechnik mit ballistischen Verbindungsmitteln zur rationellen Erstellung tragender Tafelelemente in Stahlprofil Leichtbauweise; J. Pfau; 5 pages.
Schweissen & Schneiden; Speed of Light; Sep. 2001; 7 pages.
Auszug Dissertation von Dr. Torsten Draht; 5 pages.
IFBSINFO; Zulassungsbescheid; Verbindungselemente zur Verwendung bei Konstruktionen mit "Kaltprofilen" aus Stahlblech—insbesondere mit Stahlprofiltafeln; 46 pages.
Antwortmails von Herrn Detlef Ulbrich; 1 page.
Hilti; "Referenzobjekt Direktmontage"; T. Lützow; 2003; 4 pages.
Katalog Hilti; "Handbuch der Befestigungstechnik—DX Produkte Information C3"; Ausgabe Jun. 2003; 8 pages.
Die Skizzen, anhand derer die Einsprechende die Werte vermessen hat; 4 pages.
Ein unter Mikroskop aufgenommenes Bild einer Nagelspitze eines Nagels des Typs Hilti ENPH 2-21 L15; 1 page.
Neue Impulse für das mechanische Fügen; O. Hahn et al.; Bänder, Bleche, Rochre—Mar. 2004; 2 pages.
Produktkatalog; EJOT FDS®; 20 pages.

\* cited by examiner

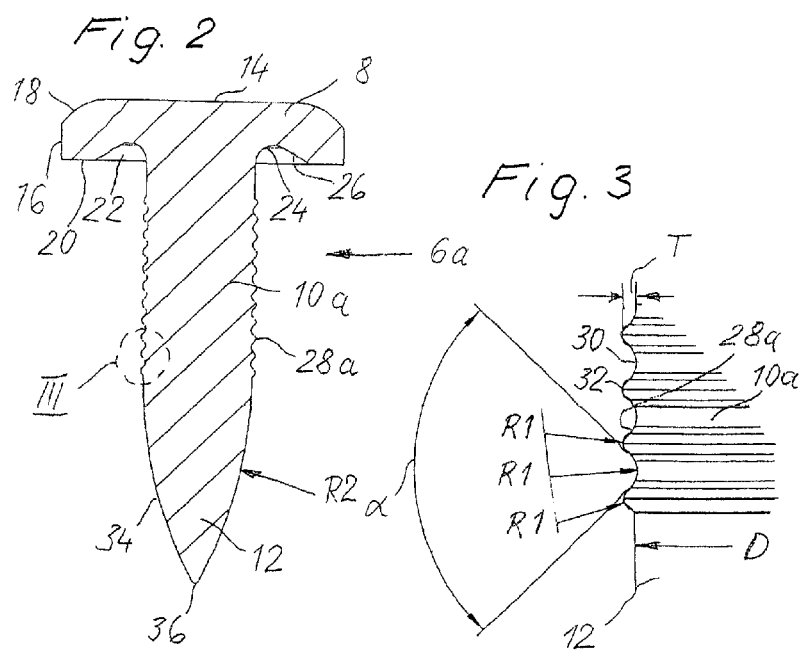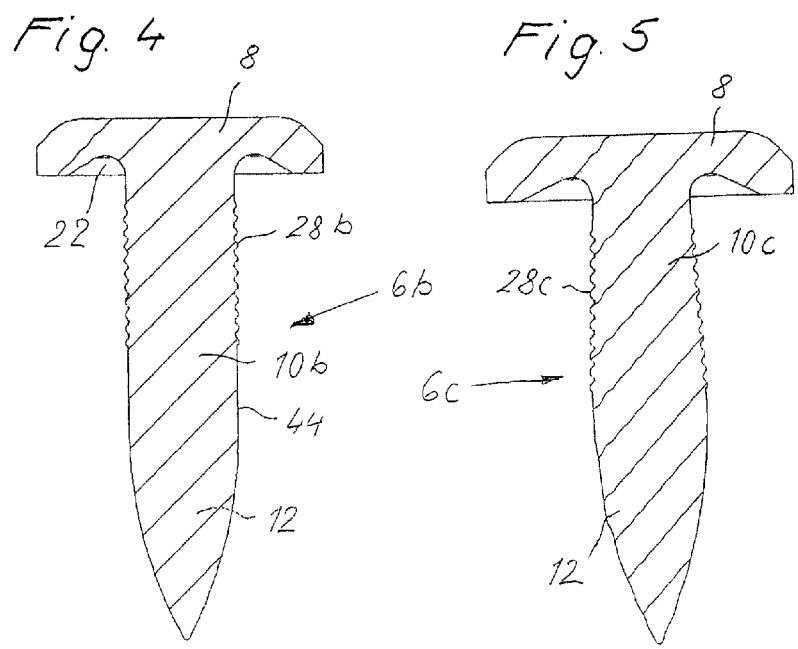

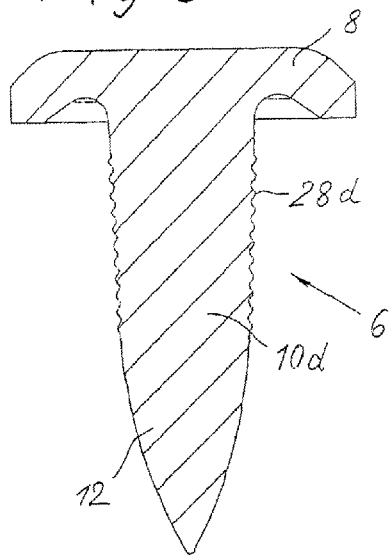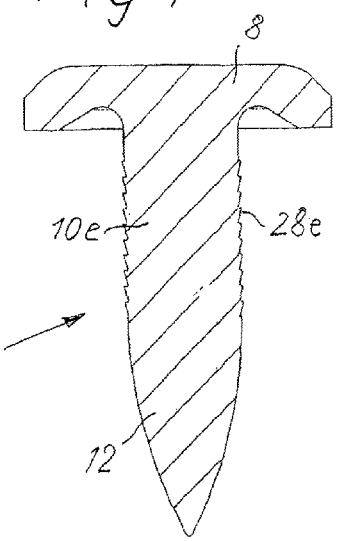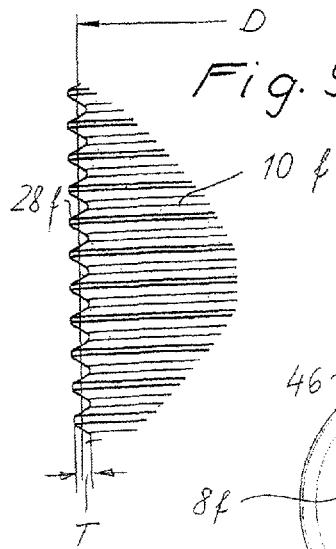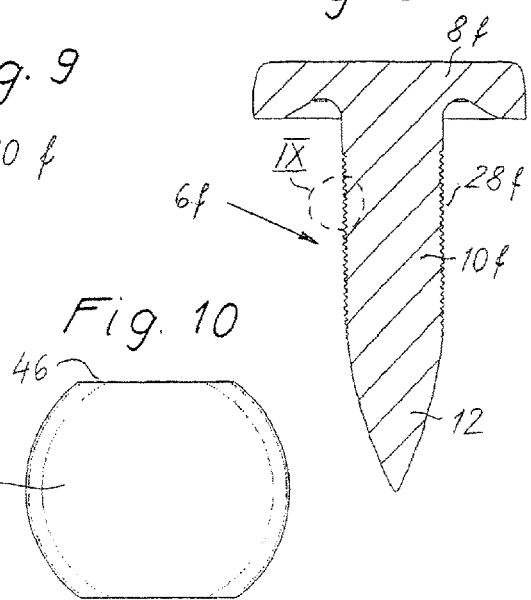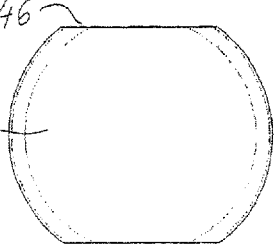

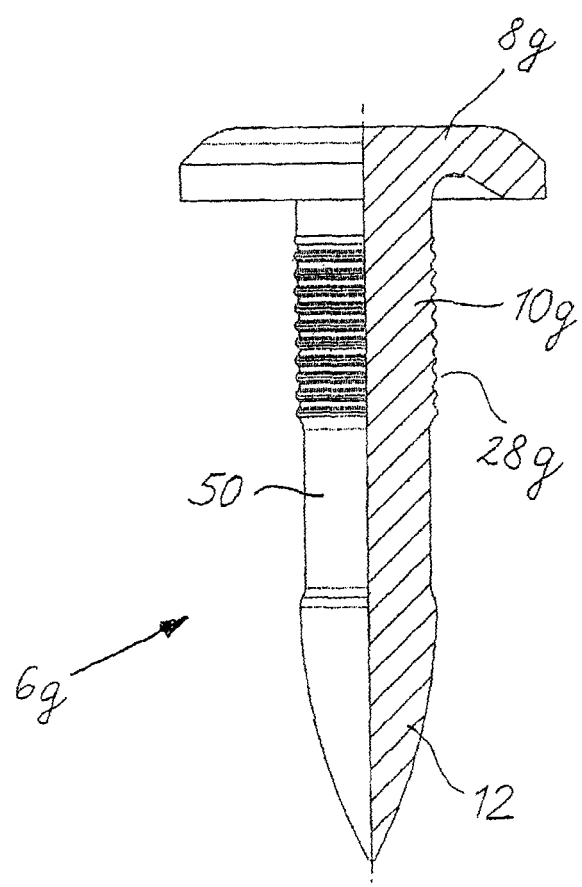

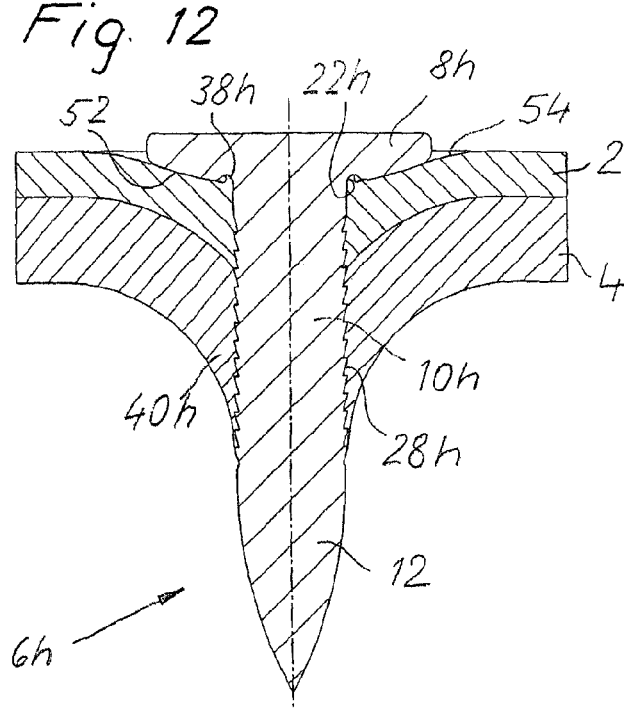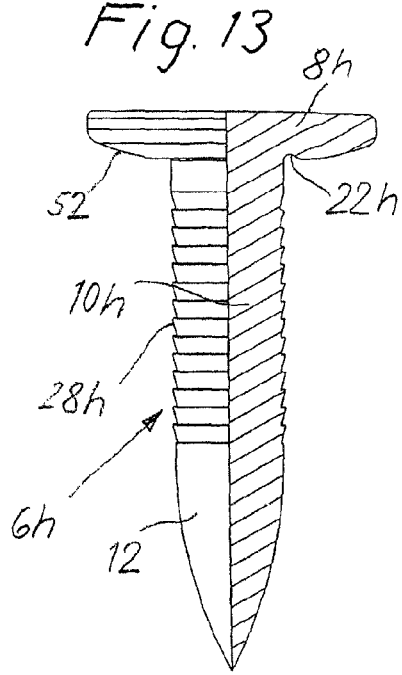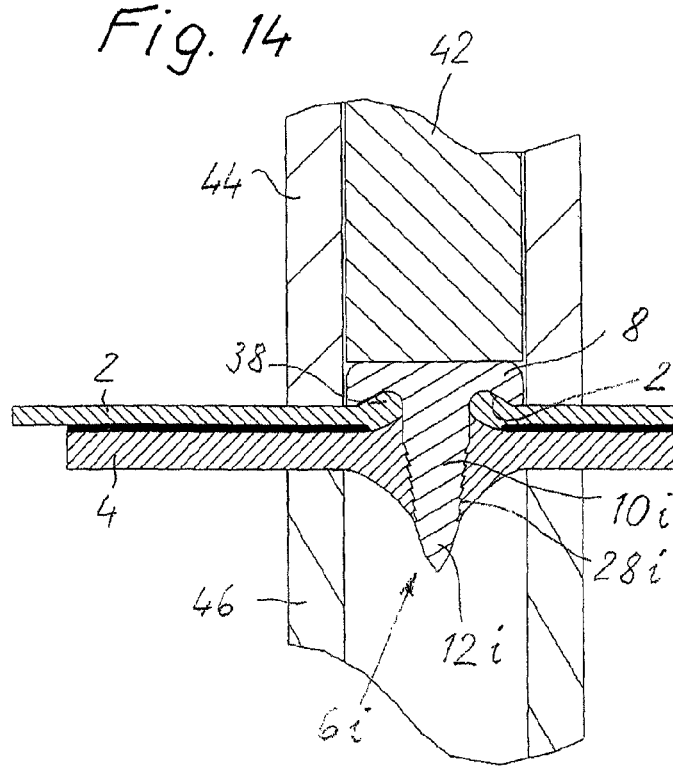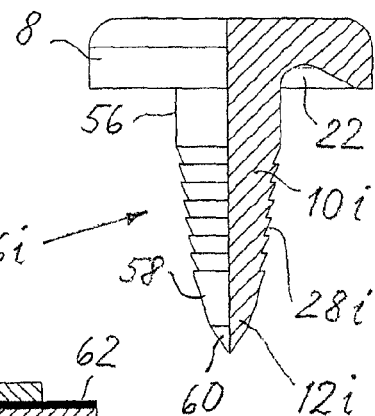

METHOD FOR ESTABLISHING A NAIL CONNECTION AND NAILS THEREFOR

CROSS REFERENCE TO RELATED APPLICATIONS

The application is a divisional application of U.S. application Ser. No. 11/994,295, filed Dec. 28, 2007, which is a national phase application of PCT/EP07/00339, filed Jan. 11, 2007, the entire contents of each noted document being herein incorporated by reference in its entirety.

FIELD OF THE INVENTION

The present invention relates to a method for establishing a nail connection between two components by means of a nail, which is driven into the components by a setting device at a high speed, as well as a nail therefor.

BACKGROUND OF THE INVENTION

This method, also known under the term "bolt setting," is a reshaping joining method, in which a nail (bolt) is driven into the components to be joined at a high speed. It has the advantage that one-sided accessibility of the joining area is generally sufficient and pre-punched hole operations can often be avoided. Bolt setting is already being used as a reliable joining method in many areas like steel construction, facade construction, metal construction, ship building and the construction industry.

Nails (setting bolts), which are driven into steel, iron, sheet metal and similar metallic substances by means of setting devices in the form of powder force-driven cartridges, are known for example from DE 1 575 152, DE 1 940 447 and DE 1 500 770. This type of nail normally consists of a nail head, nail shaft and an ogival nail tip, wherein the shaft can be provided with a surface profiling in the form of cross or arrow edgings, helically running ribbings and suchlike.

A nail (bolt) with a flat head, a cylindrical shaft and an ogival nail tip, which serves to fasten sheet metal plates on a metal part that is thicker than the sheet metal plate, is known from DE-GM 72 26 710. The nail is shot into the metal part through a prefabricated hole in the sheet metal plate. A recess for receiving the material protruding from it during the shooting into the metal part is provided in the head and/or in the shaft of the nail. In accordance with one embodiment in this document, the recess is provided on the bottom side of the nail head so that the edge of the sheet metal plate surrounding the prefabricated hole is bent up into the recess by the displaced material of the metal part. The metal part, the thickness of which is considerably larger than the length of the nail, completely surrounds the nail tip. The method disclosed in this document serves above all to fasten type plates to machines. This joining method is not suitable for fastening sheet metal plates to extruded sections with a closed cross-section or to components that have been reshaped through high internal pressure, as required for example in automobile manufacturing.

A joining method suitable for this application purpose is for example the so-called direct screwing, also known as "Flow Drilling Screw (FDS)." This method (see e.g. DE 102 48 427 A1, DE 39 22 684 A1, DE 39 09 725 C1 and DE 196 37 969 C2) uses a screw that has a flat screw head, a screw shaft provided with a thread and a screw tip. The screw is first placed on the components to be joined with a high speed and a corresponding contact force. The thus occurring frictional heat plasticizes the joining component substance to be reshaped. Crater- or toric-shaped appendages are thereby formed against and in the feed direction, into which the screw thread furrows out a counter-thread. The screw-in procedure is complete when the screw has penetrated the components and the screw head hits the upper component.

SUMMARY OF THE INVENTION

The object of the present invention is to create a method for establishing a connection between two components by means of a nail driven in at a high speed and a nail therefor, which can be used in the case of one-sided accessibility of the components, does not require the prepunching of holes in the components, enables above all a short-term joining process without rotational movement of the nail and leads nonetheless to a high quality connection.

The method according to the invention for solving this object is defined in the following claims, including a nail that can be used for this method.

The method according to the invention uses a nail, which has a nail head with a circular groove provided on the bottom side of the head, a nail shaft and a nail tip. The nail is driven mainly free of rotation and axially into the non-prepunched components in the joining area at a high speed by a setting device such that the nail tip fully penetrates both components and escapes over the component facing away from the nail head and a toric-shaped material bulge is formed in the nail-head-side component, which protrudes into the circular groove of the nail head and a crater-shaped material bulge is formed in the component facing away from the nail head, which protrudes in the direction facing away from the nail head.

The volume of the circular groove preferably mainly matches the volume of the material bulge of the nail-head-side component so that the circular groove is completely filled by the material bulge.

The nail shaft, which can be designed cylindrically or also convergent or divergent in the direction of the nail head, is preferably provided with a surface profiling, which is filled with displaced material during the joining process.

The components can be made of steel, aluminum, magnesium or plastic with or without fiber content. The nail is preferably made of steel, in particular a tempered steel, but can also be made of aluminum, magnesium, brass, ceramic or fiber-reinforced plastic.

The method according to the invention is characterized by great simplicity and extremely low joining time, since a prepunching of the components is not required and the nail is driven into and through the two components in one single joining process at a high speed without a rotational movement. As corroborated in experiments, the connection between the two components established in this manner is characterized by a high connection quality. Another advantage of the method according to the invention is that two-sided accessibility of the joining area is not required if the component facing away from the nail head is sufficiently rigid.

In the case of another embodiment according to the invention, a nail in the form of a staple bolt is used, which has a nail head with a circular groove provided on the bottom side of the head, a nail shaft with a sawtooth profiling and a nail tip. The nail is driven mainly free of rotation and axially into the non-prepunched components in the joining area at a high speed by a setting device such that the nail tip penetrates the nail-head-side component and enters the component facing away from the nail head and that a toric-shaped material bulge is formed in the nail-head-side component, which protrudes into the circular groove of the nail head, and a crater-shaped material bulge is formed in the component facing away from the nail head, which protrudes in the direction facing away from the nail head. The saw-tooth profiling is preferably aligned such that each saw tooth tapers toward the nail tip.

With this embodiment of the invention, a relatively thin component can be "fastened" to a relatively thick component by means of a staple bolt with small dimensions in order for example to let an adhesive layer between the two components harden. A complete or even just partial penetration of component facing away from the nail head is hereby possible.

Further advantageous embodiments and further developments of the invention arise from the dependent claims.

BRIEF DESCRIPTION OF THE DRAWINGS

Exemplary embodiments of the invention are explained in greater detail based on the drawings.

FIG. 2 shows a longitudinal section through the nail in FIG. 1;

FIG. 3 shows an enlarged view of one detail taken through line in FIG. 2;

FIG. 4 through FIG. 8 shows longitudinal sections in accordance with FIG. 2 of a modified embodiment of the nail according the invention;

FIG. 9 shows an enlarged view of one detail taken through IX of FIG. 8;

FIG. 10 shows a view from the top of the nail head of the nail in FIG. 8;

FIG. 11 shows a partially cut view of another embodiment of the nail according to the invention;

FIG. 12 shows a cut view of a connection between two components by means of a nail of another embodiment of the invention;

FIG. 13 shows a partially cut side view of the nail from the connection in FIG. 12;

FIG. 14 shows a cut view of a connection between two components by means of a nail with parts of the establishing device according to a modified embodiment of the invention;

FIG. 15 shows a partially cut side view of the nail of the connection in FIG. 14.

DETAILED DESCRIPTION OF A PREFERRED EMBODIMENT OF THE INVENTION

Figure 1:
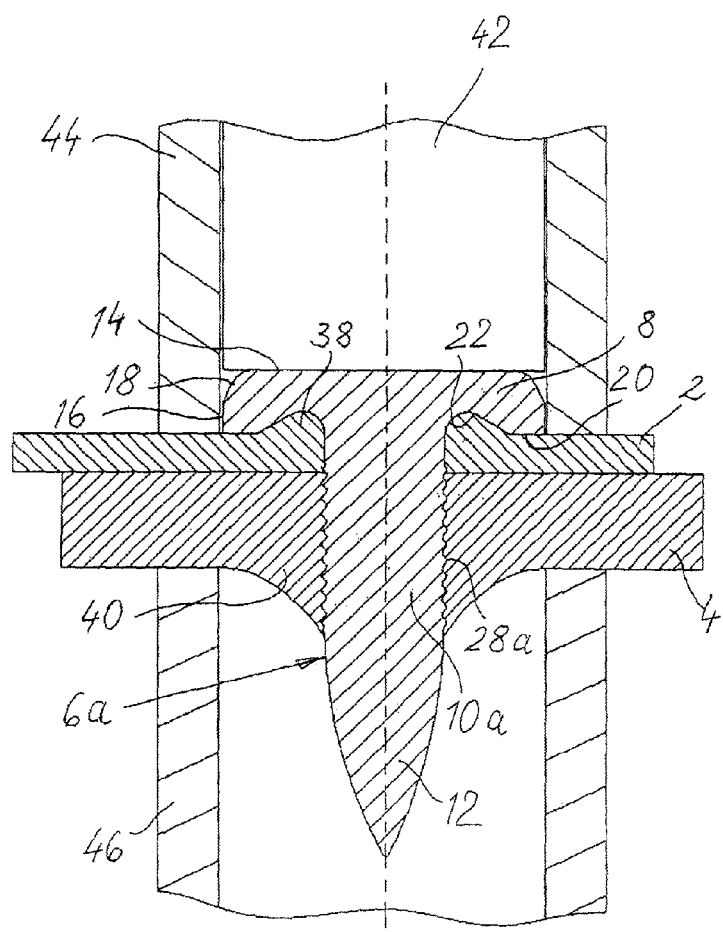
FIG. 1 shows a partially cut view of a connection between two components by means of a nail established with the method according to the invention with parts of the establishing device.

FIG. 1 shows a finished connection between a component 2 and a component 4 by means of a nail 6a. In the exemplary embodiment shown, the component 2 is a thin-walled component in the form of a sheet metal plate, and the component 4 is a component with a larger wall thickness, which is for example a profile component. They can, for example, be body parts for automobile manufacturing, while the invention is not restricted to this application.

The components 2, 4 can be made of steel, aluminum, magnesium or plastic with or without fiber content. They are not prepunched before the joining process, as will be explained in greater detail.

As can be seen in FIGS. 1 and 2, the nail 6a consists of a nail head 8, a nail shaft 10a and a nail tip 12.

The nail head 8 is a flat head with an even top side 14, a cylindrical circumferential surface 16 and an even bottom side 20, in which a circular groove 22 is formed adjacent to the nail shaft 10a. The circular groove 22 has a rounded circumferential surface 24, which on one side passes tangentially into the nail shaft 10a and on the other side tangentially into a conical surface 26.

The nail shaft 10a is designed mainly cylindrically in the exemplary embodiment in FIGS. 1, 2 and is provided with a surface profiling 28a in a certain area of its surface. As can be seen in particular in FIG. 3, the surface profiling 10a in the exemplary embodiment shown consists of a series of circular recesses 30 and ridges 32. The surface profiling 28a thus has a rounded wave-like profile in axial sections, which is designed in a sinusoidal manner in the exemplary embodiment shown. The radii of the recesses 30 and ridges 32 labeled with R1 in FIG. 3 are thus identical. The angle $\alpha$ between the flanks of the ridges 32 is hereby on the order of magnitude of 90°.

As shown, the surface profiling 28a only has a relatively low depth. The ratio of the depth T of the surface profiling 28a to the average shaft diameter D is preferably less than 0.1 and in particular less than 0.05. This ratio is for example on the order of magnitude of 0.03.

The nail tip 12 has an ogival surface 34 with a rounded end point 36. The ogivality factor, i.e. the ratio of the radius R2 to the shaft diameter D of the ogival surface 34, is e.g. on the order of magnitude of 2 to 6, preferably in the range of 3 to 5 and is in particular approximately 4.

The nail 6a including the head, shaft and tip is designed rotationally symmetrical, which also applies to the exemplary embodiments in FIGS. 4 through 7 and 11.

The nail 6a is preferably made of steel. However, depending on the application, it can be made of aluminum, magnesium, brass, ceramic or fiber-reinforced plastic. In the exemplary embodiment shown, the nail 6a is uncoated; it can, however, also be coated.

As shown, the nail 6a is designed as one single piece. However, it is generally also possible to produce the nail head on one hand and the nail shaft with the nail tip on the other hand from two parts with different hardnesses, which are then connected together. Thus, for example, the nail shaft with the tip can be made of metal and the nail head can be made of aluminium, which are then combined by means of friction welding.

The method for establishing the connection shown in FIG. 1 between the components 2 and 4 by means of nail 6a will now be described:

As already mentioned, the components 2 and 4 cannot be prepunched before the joining process. If both components 2 and 4 are adjacent to each other, the nail 6a is driven from above into the two components 2 and 4 by a setting device at a high speed. The setting speed depends on the application case and lies e.g. between 5 and 300 m/s, preferably 10 and 100 m/s.

The bolt setting device is for example a bolt shooting device, a powder-force-driven cartridge or suchlike. FIG. 1 shows a piston 42 of this type of setting device. Furthermore, the mouthpiece 44 of a hold-down device that is not shown in greater detail can also be seen.

As already mentioned, the method according to the invention can be performed in the case of just one-side accessibility of the joining location. However, if the component 4 does not have sufficient rigidity, a counterholder in the form of a sleeve 46 should be provided, on which the components 2, 4 are supported.

During the joining process, the nail tip 12 first enters the component 2. This leads to a material bulge on the top side of the component 2, which grows as the nail tip 12 enters the component 2.

The nail tip 12 then penetrates through the lower component 4. This leads on one hand to a crater-shaped material bulge 40, which becomes larger in the drive direction during the penetration of the nail tip 12. On the other hand, material flows into the surface profiling 28a, whereby the recesses in the surface profiling 28a are completely filled with material 4. This preferably concerns material of the component 4. However, it can sometimes not be prevented that the recesses of the surface profiling 28a fill at least partially with material of the component 2.

The joining process is complete when the bottom side of the nail head 8 rests on the top side of the component 2. The nail head 8 is designed such that it has a certain flexibility in order to avoid crack formation under the nail head and to be able to counterbalance slight inclinations of the nail. If the setting stamp 42 is released from the nail head 8, the nail 6a springs back slightly. The components 2, 4 are hereby tensioned together, which benefits the connection quality.

The volume of the circular groove 22 mainly matches the volume of the material bulge 38, so that the circular groove 38 is completely filled with the material of the component 2. In the case of body shell applications, in which the component 2 is provided with a coating (paint or cathodic lacquer), there can thus be no bubble formation by the trapped air.

As shown, the surface profiling 28a is only provided in the area of the nail shaft 10a that is located within the substance of the component 4 in the case of the finished connection. In this manner, a connection with high extraction resistance is created, since the components 2, 4 are tensioned together on one hand through frictional and form closure between the nail shaft 10a and component 4 and on the other hand through form closure between the nail head 8 and component 2. As shown, the components 2 and 4 remain mainly undeformed in the separation plane so that the evenness of the contact surfaces of the components 2 and 4 is retained. As can also be seen in FIG. 1, the nail tip 12 mainly projects fully out of the component 4.

As can easily be seen, the joining process only requires accessibility from the top side. The joining process is extremely simple, since neither a prepunching of the components 2, 4 nor a rotational movement of the nail 6a is required. The joining time is extremely short. Moreover, only comparably low joining forces are required. Nonetheless, a high connection quality with correspondingly high extraction resistance results.

As was also shown, the rounded shape of the surface profiling 28a leads to comparatively low tensions in the connection between the components 2, 4 and the nail 6a, which accordingly contributes to the connection quality.

As can be seen in FIG. 1, the surface of the nail head 8 extends almost up to the outer edge (circumferential surface 16) of the nail head 8. Only a relatively small rounding or bevel 18 is provided between the evenly designed top side 14 and the circumferential surface 16 so that the piston 42 on the nail head 8 mainly engages over its entire width.

If the bolt tip 12 enters the components 2, 4, the largest part of the setting force of the piston 42 is transferred to the central area of the nail head 8 so that correspondingly high tensions are created in the central area of the nail head 8. If the nail head 8 is set on the top side of the component 2 at the end of the setting process, the largest part of the setting force is transferred from the piston 42 to the radially exterior area of the nail head 8 and from there over the outer surface of the bottom side 20 to the components 2, 4, while the central area of the nail head 8 is decompressed.

The setting forces exerted by the piston 42 are thus not fed to the nail shaft 10a. In this manner, it is avoided that the placement of the nail 6a on the component 2 leads to a "puncture," even if the setting process itself was operated with excess energy. In the case of the so-called "penetration," the nail head 8 enters the component 2 and a crack also forms between the surface profiling 28a of the nail shaft 10a and the hole in the component 4.

The hold-down device 44 serves above all to push the components 2 and 4 against each other before and during the setting process. Hold-down forces of less than 3 kN are generally sufficient here. Higher hold-down forces for the manipulation of the material properties of the components 2 and 4 are not generally required.

The counterholder in the form of the sleeve 46 is, as already mentioned, only required if the component 4 is not sufficiently rigid.

Based on FIGS. 2 through 10, different embodiments of the nail are described, which can be used in the method according to the invention.

The nail 6b in FIG. 4 is different from the nail 6a in FIG. 2 only in that a cylindrical section 48 is provided between the nail tip 12 and the part of the nail shaft 10b provided with the surface profiling 28b, whereby the nail shaft 10b receives a correspondingly longer length. The longer nail shaft 10b benefits the tension release phase after the nail tip enters the components, whereby deformations of the components are reduced.

The nail 6c in FIG. 5 is different from the nail 6a in FIG. 2 only in that the nail shaft 10a has a mainly conical shape, which converges from the nail tip 12 in the direction of the nail head 8. The surface profiling 28c is hereby modified to the conical form of the nail shaft 10c such that its depth remains mainly constant. This "waisting" of the nail shaft 10c permits the reaching of a higher extraction resistance of the connection.

In the case of the nail 6d in FIG. 6, the nail shaft 10d with the surface profiling 28d is also designed mainly conically, however such that it runs divergent from the nail tip 12 in the direction of the nail head 8. A well tensioned arrangement and an improved tiling of the surface profiling 28b are hereby achieved.

The nail 6e in FIG. 7 has a mainly cylindrical nail shaft 10e with a surface profiling 28e, which is designed in a sawtooth-like manner in longitudinal sections. This permits the achievement of a higher extraction resistance, the trade-off of which however must be the higher tensions in the connection.

The nail 6f in FIGS. 8 through 10 is provided with a surface profiling 28f in the form of a thread. The thread, which is shown enlarged in FIG. 9, is designed as a fine thread, the incline of which is preferably less than 3.5 and is e.g. on the order of magnitude of 0.25.

The other joining parameters in connection with the design of the surface profiling 28f are selected such that the nail 6f is driven through the two components 2, 4 during the joining process, without the nail 6f carrying out a noticeable rotational movement. As in the exemplary embodiments described above, the thread pitches of the surface profiling 28f fill with plasticized material. This forms a counter thread to the components 2, 4. The nail 6f can thus be released from the two components 2, 4 again after the setting process. For this purpose, the nail head 8f is provided with a drive characteristic 46, so that the nail 6f can be screwed out of the components with the help of a tool (not shown).

The nail 6g in FIG. 11 mainly matches the nail 6b in FIG. 4, i.e. it has a nail head 8g, a nail shaft 10g with a surface profiling 28g, a nail tip 12 and a non-profiled section 50, which is arranged between the nail tip 12 and the part of the nail shaft 10g provided with the surface profiling 28g. However, in contrast to the exemplary embodiment in FIG. 4, the profile-free section 50 has a tapered shaped, i.e. its diameter is smaller than the maximum diameter of the nail tip 12 and than the diameter of the part of the nail shaft provided with the surface profiling 28g. In the exemplary embodiment shown, the reduced diameter section 50 is designed cylindrically; however, it could in general also have a different geometric shape.

Based on the diameter reduction of the section 50, a pressure reduction results when the nail 8g enters the components 2, 4 as soon as the nail tip 12 has completely entered the material of the components. This pressure reduction results in less deformation of the components 2, 4 and thus higher connection capabilities.

The described process for setting the nail is used particularly advantageously in connection with a gluing of the components 2, 4. In the case of this hybrid joining technique, the components 2, 4 are also connected together on their adjacent surfaces through an adhesive, whereby an extremely high-strength and uniform connection is established between the components 2, 4. Any conventional adhesive, a large variety of which are known from the state of the art, can be used.

One important advantage of the method described is that only a very short setting duration is required for the setting of a nail. Furthermore, the method, as already explained in detail, can be performed without prepunching and with only one-sided accessibility of the components. These advantageous properties make the described method particularly suitable for "continuous nailing," as explained below:

Two components must often be connected together at several spaced joining locations, for example along joining flanges. In the case of convention mechanical joining processes, the setting device is then moved successively by a robot to the joining locations. The setting device is first stopped at each joining location, the joining process is performed and the setting device is accelerated again. This naturally leads to comparatively long cycle times. Thus, the punch riveting, clinching, blind riveting and nailing joining techniques require cycle times of 2-7 s, 2-6.5 s, 3-7.5 s or 3-8 s when using the initially described FDS method.

In contrast to the described discontinuous joining of the components at the joining locations, the method according to the invention allows a "continuous joining." More exactly, the movement of the setting device created by the robot from joining location to joining location is continuous, wherein the nails are set during this feed motion in accordance with the method described above. The components are advantageously held in the correct position with respect to each other during the continuous flow of this joining process by corresponding tensioning devices. The only prerequisite is that the joining locations for the setting device are accessible. This is often the case when the joining locations are located on joining flanges.

The continuous nailing is facilitated in that a precise control of the joining locations is not generally required for the setting of the nail according to the described method. The feed motion of the setting device performed by the robot can take place in a contact-free manner. However, instead of this, a mouthpiece provided on the setting device (hold-down device 44 in FIG. 1) can rest against the upper component 2.

In each case, the cycle times are considerably reduced since no braking and acceleration processes are required by the robot and shorter setting times are also achieved than in the case of conventional mechanical joining processes. Thus, cycle times on the order of magnitude of 1.5-3 s are possible with the described process, which reduces the cycle time by approx. 50%.

As already explained in connection with FIG. 1, it is advantageous to push together the components 2, 4 to be connected during the bolt setting by means of a hold-down device, whereby hold-down forces on the order of magnitude of up to 20 kN are conceivable. The hold-down device normally forms part of the setting device. A continuous nailing, as described above, is then not possible in the case of the use of a hold-down device. However, instead of a hold-down device, a stationary gripping mechanism (not shown) can also be provided, which pushes the two components against each other with a corresponding force independently of the setting device and at locations outside of the joining areas. In this case, a continuous nailing is then possible in that the setting device is operated in a non-contact manner, whereby only a driving spike of the setting device has contact with the components to be connected via the nail and the mouthpiece of the setting device is thus, in a manner of speaking, "floated" over the nail-head-side component.

FIGS. 12 and 13 show another embodiment of a nail 6h designed according to the invention. The shaft 10h with its sawtooth profile 28h and the nail tip 12 of the nail 6h mainly match the nail shown in FIG. 7. As in FIG. 7, the sawtooth profile 28h is also aligned here such that each tooth is tapered in the direction of the nail tip 12. The difference is that the nail head 8h is designed as a countersunk head.

The nail head 8h of nail 6h has on its bottom side a diagonally running section 52, which transitions into a circular groove 22h. The circular groove 22h, which lies between the diagonally running section 52 and a cylindrical section of the shaft 10h, has very small dimensions compared to the diagonally running section 52. The diagonally running section 52 is preferably slightly curved, in order to ensure an even force distribution between the nail head 8h and the top side of the component 2. The nail head 8h designed as a countersunk head also has a considerably smaller thickness than the nail heads in the previous exemplary embodiments.

Based on the described geometry, the countersunk head of the nail 6h enters at least partially the top side of the component 2. More exactly, the nail head 8h deforms the upper component 2 such that a funnel-like depression 54 is formed, which largely receives the nail head 8h. Moreover, the components 2, 4 in the joining area, i.e. below the countersunk head, are deformed downwards so that a funnel-like progression can also be observed in the contact area between the two components 2, 4.

In particular when the nail-head-side component 2 is made of steel, there is a comparatively small material bulge 38h, which only partially fills the circular groove 22h, on its top side. Please note here that the connection in the case of the previous exemplary embodiments can also be designed such that the material bulge 38 only partially fills the circular groove 22 in contrast to the illustration in FIG. 1.

FIGS. 14, 15 show an embodiment of the invention, in which the nail 6i is designed as a "staple bolt." It serves to "staple" a relatively thin component 2 to a thicker component 4. This embodiment is used in particular in connection with an adhesive connection of the components 2, 4, between which an adhesive layer 62 is provided. The component 2 is hereby stapled by one or more staple bolts on the component 4, so that the adhesive layer 62 can harden.

The nail 6*i* designed as a staple bolt has a nail head 8 with a circular groove 22 according to the exemplary embodiments in FIGS. 1 through 8. The shaft 10*i* of the nail 6*i* is designed such that a cylindrical section 56 is connected to the nail head 8, which crosses over into a conically tapering shaft section with a sawtooth profiling 28*i*. The sawtooth profiling 28*i* is aligned such that each tooth is tapered in the direction of the nail tip 12*i* so that a radially progressing should surface is formed on the side of each tooth facing towards the nail head 8. The nail tip 12*i* connected to the sawtooth profiling 28*i* is made up of a truncated-cone-shaped section 58 and an apex-like section 60, wherein the cone angle of the section 58 is less than the cone angle of the section 60.

Even if the nail tip 12*i* in the exemplary embodiment shown is made up of the two sections 58, 60 with different cone angles, the nail tip can also be designed in a different manner, for example as an ogival nail tip according to the previous exemplary embodiments. The tapering of the nail tip and the nail shaft in the area of the sawtooth profiling 28*i* is important.

Similar to FIG. 1, FIG. 14 in turn shows a hold-down device 44 and a counterholder in the form of a sleeve 46.

The nail 6*i* designed as a staple bolt has considerably smaller dimensions than the previous embodiments of the invention. Thus, the staple bolt has for example a length on the order of magnitude of 6 mm. Based on the depicted illustration of the nail shaft 10*i* and the nail tip 12*i*, the intended sleeve end of the sawtooth profiling 28*i* has a shape, which is almost the same as the shape of a parabola in axial cuts, in connection with the profile of the nail tip 12*i*.

The geometry of the nail shaft 10*i* and the nail tip 12*i* and in particular the alignment of the surface profiling 28*i* ensure that the nail 6*i* can be driven into the components 2, 4 by the piston 42 (driving spike) of the otherwise unshown setting device with comparatively low drive-in force, while the extraction resistance against the drive-in direction is relatively high due to the shoulder-like surfaces between the teeth of the sawtooth profiling 28*i*. An important advantage of the nail 6*i* designed as a staple bolt is that it hardly has an effect on the adhesive layer 62 during the "stapling process." As shown in experiments, the thickness of the adhesive layer 62 is the same before and after the stapling process.

In the case of the connection shown in FIG. 14, the nail head 12*i* protrudes largely over the crater-shaped material bulge 40 of the component 4. However, the nail 6*i* and the components 2, 4 are preferably dimensioned such that the free end of the nail tip 12*i* only protrudes slightly or not at all from the component 4. A solution in which the free end of the nail tip 12*i* just closes the bottom end of the material bulge 40 is also conceivable.

As already mentioned, an important advantage of the method according to the invention is that the nail can be driven into the two components 2, 4 with one single blow from the bolt setting device, so that the nail head rests on the nail-head-side component. This applies to all embodiments shown. However, it is also generally possible to perform the setting process such that the nail is not driven all the way into the components by a blow delivered from the setting device, but rather only e.g. 80% to 90% of the maximum possible drive-in path. The rest of the driving in of the nail up to the head can then take place with one or more additional blows. These additional blows can either be performed manually with a hammer or via a driving spike or also automatically. As determined in experiments, this "multi-stage" bolt setting does not have a negative impact on the stability of the connection, which applies to both components made of aluminium and components made of steel.

We claim:

1. A combination comprising a nail which establishes a connection between two non-prepunched components made of steel, aluminum, magnesium or plastic, wherein the nail, including a nail head, a nail shaft and a nail tip is designed rotationally symmetrically, the nail being made from a single piece comprising:

the nail head which is a flat head with an even top side, a cylindrical circumferential surface and an even bottom side wherein a circular groove is formed in the even bottom side adjacent to on the one hand the nail shaft and on the other hand an outer surface of the even bottom side extending to the cylindrical circumferential surface in order to transfer a setting force at an end of a setting process from a piston to the components, said circular groove receiving a toric-shaped material bulge of a nail-head side component;

wherein the nail shaft is primarily cylindrical and is provided with a surface profiling for receiving material from a component of the combination facing away from the nail head and wherein material from the component facing away from the nail head is drawn along the nail shaft to form a material bulge; and the nail tip having an ogival shape with an ogivality factor of 3 to 5.

2. The combination according to claim 1, wherein the circular groove has a rounded surface adjacent to the nail shaft, in which the rounded surface transitions into a conical surface.

3. A nail according to claim 1, wherein nail shaft is designed convergent in the direction of the nail head.

4. A nail according to claim 1, wherein the nail shaft is shaped divergent in the direction of the nail head.

5. The combination according to claim 1, wherein the surface profiling is arranged only in one area of the nail shaft, which lies within the component facing away from the nail head.

6. The combination according to claim 1, wherein the ratio of the maximum depth of the surface profiling to the average diameter of the nail shaft is less than 0.1.

7. The combination according to claim 1, wherein the surface profiling consists of a series of circular recesses and ridges so that the surface profiling in axial sections is made up of a rounded wave-like profile.

8. A nail according to claim 1, wherein the surface profiling in axial sections is made up of a sawtooth profile.

9. A nail according to claim 1, wherein the surface profiling is formed from a series of circular recesses and ridges.

10. A nail according to claim 1, wherein the surface profiling is formed by a thread, which forms a corresponding counter thread during the axial driving of the nail into both components.

11. A nail according to claim 10, wherein the incline of the thread formed by the surface profiling is less than 0.35.

12. A nail according to claim 10, wherein the nail head has a drive characteristic for the engagement of a tool, in order to be able to release the nail from the two components again.

13. A nail according to claim 1, including a profile-free section provided between a part of the nail shaft provided with a surface profiling and the nail tip.

14. A nail according to claim 13, including a reduced diameter section provided between a part of the nail shaft provided with a surface profiling and the nail tip.

15. The combination according to claim 1, wherein the even top side of the nail head is mainly even up to its outer edge in order to mainly transfer the setting forces exerted on the nail head in the end position of the nail to a nail-head-side component and to thereby avoid a penetration of the nail through the two components.

16. The combination according to claim 1, wherein the nail tip has an ogivality factor of 4.

17. The combination according to claim 1, wherein the nail is made of the single piece of a material from the group consisting essentially of steel, aluminum, magnesium, brass, ceramic and a fiber-reinforced plastic.

18. The combination according to claim 1, wherein the nail head is a countersunk head, the even bottom side of said nail head having a diagonally running section and the circular groove across from it such that the countersunk head enters at least partially the material of a nail-head-side component.

* * * * *

UNITED STATES PATENT AND TRADEMARK OFFICE
CERTIFICATE OF CORRECTION

PATENT NO. : 9,435,366 B2  
APPLICATION NO. : 13/618229  
DATED : September 6, 2016  
INVENTOR(S) : Draht et al.

Page 1 of 2

It is certified that error appears in the above-identified patent and that said Letters Patent is hereby corrected as shown below:

In the Claims

Correction of Claim 3 is requested as follows:  
Column 10  
Line 36, please change "A nail according to claim 1, wherein nail shaft is" to --The combination according to claim 1, wherein the nail shaft is--

Correction of Claim 4 is requested as follows:  
Column 10  
Line 38, please change "A nail according to claim 1, wherein the nail shaft is" to --The combination according to claim 1, wherein the nail shaft is--

Correction of Claim 8 is requested as follows:  
Column 10  
Line 51, please change "A nail according to claim 1, wherein the surface" to --The combination according to claim 1, wherein the surface--

Correction of Claim 9 is requested as follows:  
Column 10  
Line 53, please change "A nail according to claim 1, wherein the surface" to --The combination according to claim 1, wherein the surface--

Correction of Claim 10 is requested as follows:  
Column 10  
Line 56, please change "A nail according to claim 1, wherein the surface" to --The combination according to claim 1, wherein the surface--

Signed and Sealed this  
Twenty-fifth Day of April, 2017

Michelle K. Lee  
*Director of the United States Patent and Trademark Office*

CERTIFICATE OF CORRECTION (continued)
U.S. Pat. No. 9,435,366 B2

Correction of Claim 11 is requested as follows:
Column 10
Line 60, please change "A nail according to claim 10, wherein the incline of the" to --The combination according to claim 10, wherein the incline of the--

Correction of Claim 12 is requested as follows:
Column 10
Line 62, please change "A nail according to claim 10, wherein the nail head has" to --The combination according to claim 10, wherein the nail head has--

Correction of Claim 13 is requested as follows:
Column 10
Line 65, please change "A nail according to claim 1, including a profile free" to --The combination according to claim 1, including a profile free--

Correction of Claim 14 is requested as follows:
Column 11
Line 1, please change "A nail according to claim 13, including a reduced" to --The combination according to claim 13, including a reduced--